(12) United States Patent
Utashiro

(10) Patent No.: US 7,573,699 B2
(45) Date of Patent: Aug. 11, 2009

(54) SOLID STATE ELECTROLYTE CAPACITOR AND MANUFACTURING METHOD THEREOF

(75) Inventor: Tomoya Utashiro, Tokyo (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 11/966,916

(22) Filed: Dec. 28, 2007

(65) Prior Publication Data

US 2008/0106855 A1    May 8, 2008

Related U.S. Application Data

(63) Continuation of application No. PCT/JP2006/312982, filed on Jun. 29, 2006.

(60) Provisional application No. 60/697,961, filed on Jul. 12, 2005, provisional application No. 60/706,030, filed on Aug. 8, 2005.

(30) Foreign Application Priority Data

Jun. 30, 2005   (JP)   ............................. 2005-192456
Jul. 27, 2005   (JP)   ............................. 2005-217713

(51) Int. Cl.
*H01G 5/38*   (2006.01)
*H01G 9/00*   (2006.01)
*H01G 9/04*   (2006.01)

(52) U.S. Cl. ................. 361/541; 361/531; 361/533; 29/25.03

(58) Field of Classification Search ............... 361/541, 361/523, 532, 533, 531; 29/25.03
See application file for complete search history.

(56) References Cited

U.S. PATENT DOCUMENTS

| 6,249,424 | B1 | 6/2001 | Nitoh et al. | |
| 2003/0156364 | A1* | 8/2003 | Kuroyanagi | ................. 361/15 |
| 2004/0023442 | A1* | 2/2004 | Konuma et al. | ............ 438/141 |
| 2004/0174658 | A1* | 9/2004 | O'Phelan et al. | ............ 361/509 |

FOREIGN PATENT DOCUMENTS

| JP | 06-204097 A | 7/1994 |
| JP | 10-144573 A | 5/1998 |
| JP | 2000-068158 A | 3/2000 |

* cited by examiner

*Primary Examiner*—Eric Thomas
*Assistant Examiner*—David M Sinclair
(74) *Attorney, Agent, or Firm*—Sughrue Mion, PLLC

(57) ABSTRACT

A solid electrolytic capacitor, including a stack of solid electrolytic capacitor elements each having an anode part and a cathode part. The stacked structure is such that cathode parts of solid electrolytic capacitor elements are stacked one on another to have some misalignment between the stacked elements. The capacitor preferably has a structure in which one end part of the cathode part of at least one of the solid electrolytic capacitor elements stacked on another element is more prominent or retracted than that of the element below.

35 Claims, 2 Drawing Sheets

[Fig. 1]
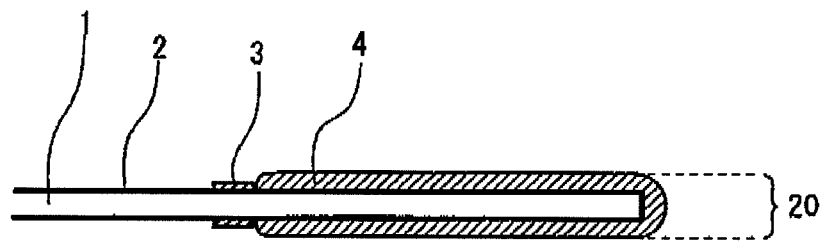
[Fig. 2]
(A)
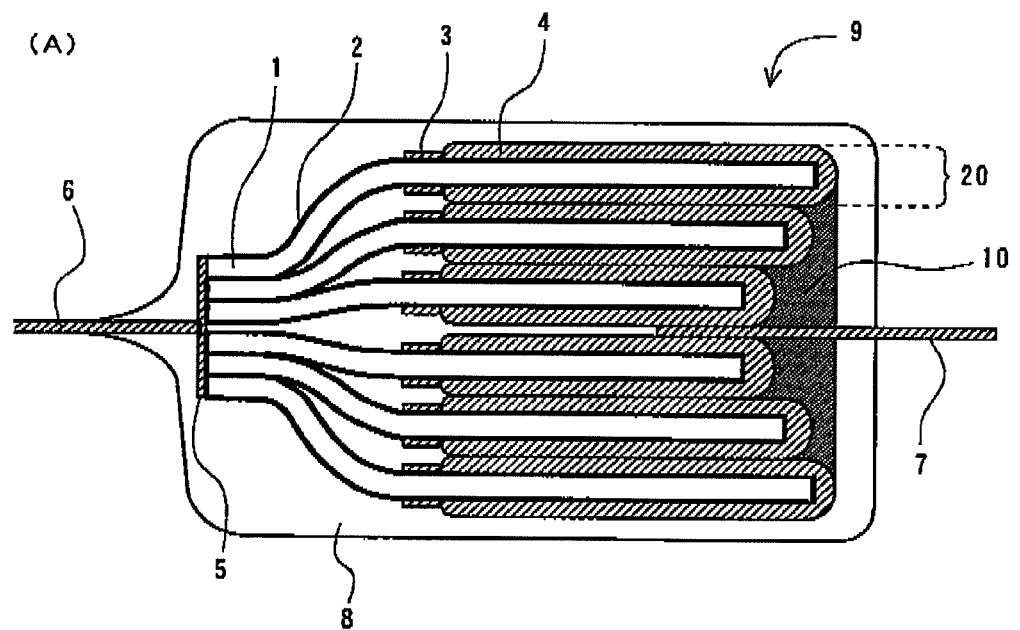
(B)
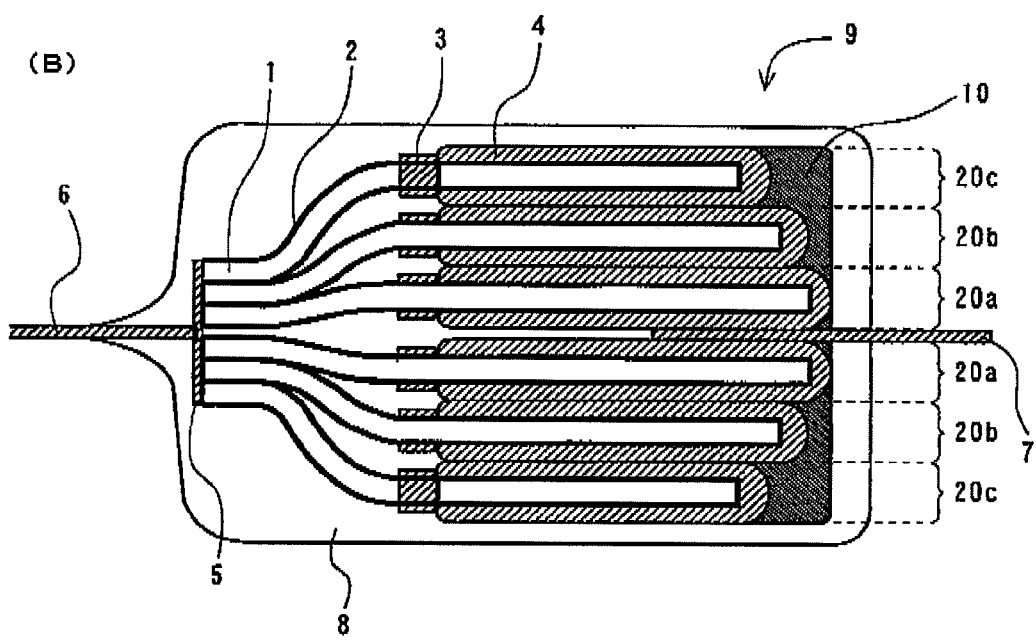

[Fig. 3]
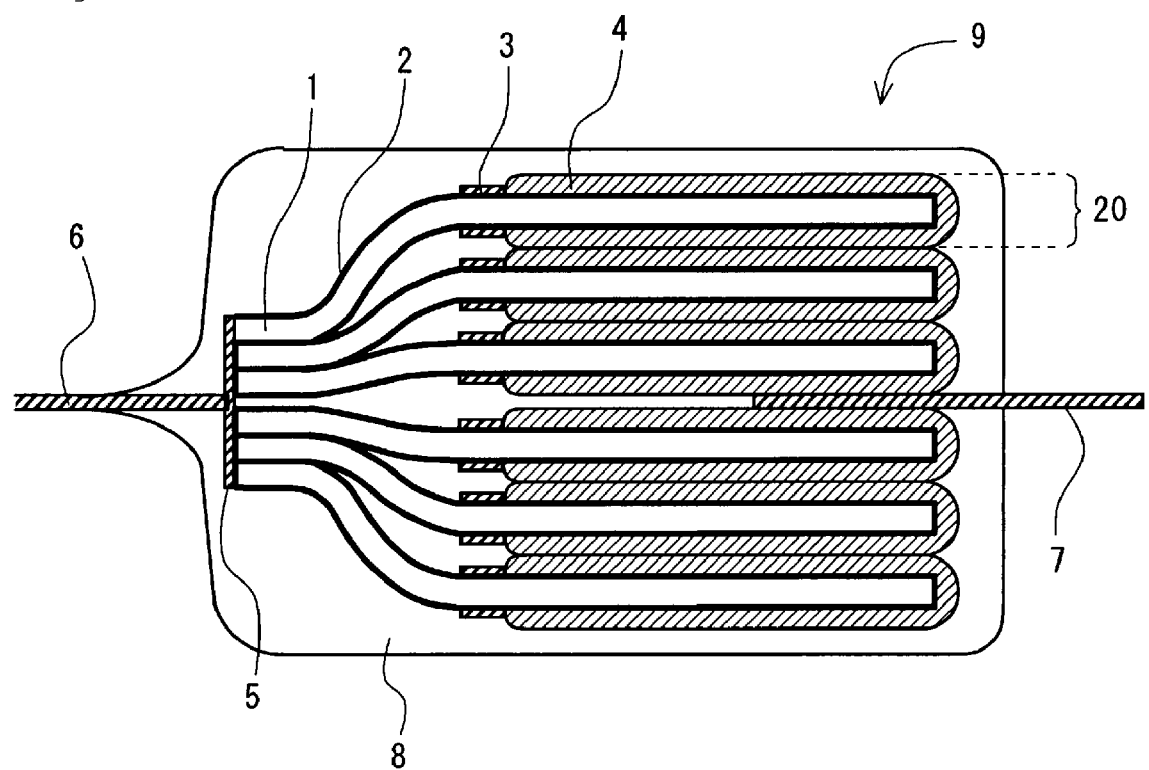
PRIOR ART

SOLID STATE ELECTROLYTE CAPACITOR AND MANUFACTURING METHOD THEREOF

CROSS-REFERENCE TO RELATED APPLICATIONS

This is a Continuation of PCT/JP2006/312982 filed Jun. 29, 2006, which claims benefit from Provisional Application Nos. 60/697,961 filed Jul. 12, 2005 and 60/706,030 filed Aug. 8, 2005; the above-noted applications incorporated herein by reference in their entirety.

TECHNICAL FIELD

The present invention relates to a solid electrolytic capacitor and production method thereof. More specifically, the invention relates to a solid electrolytic capacitor having improved electric properties, particularly reduced ESR (equivalent series resistance) or LC (leakage current), by using a novel cathode-laminated structure and production method thereof.

BACKGROUND ART

Solid electrolytic capacitors comprising electroconductive polymer as solid electrolyte, which can reduce equivalent series resistance and leakage current, are useful as capacitors satisfying needs for higher performance and downsizing of electronic devices, as compared with those solid electrolytic capacitors comprising manganese dioxide or the like as solid electrolyte. A solid electrolytic capacitor having a predetermined capacitance can be obtained by laminating solid electrolytic capacitor elements (elementary elements). Generally, an elementary element for solid electrolytic capacitor is, as shown in FIG. 1, prepared by forming a dielectric oxide film layer (2) on an anode substrate (1) of etched metal foil having a large specific surface area, forming a solid semiconductor layer (4) (hereinafter, referred to as solid electrolyte) on the oxide film layer as counter cathode part, and preferably further forming a conductive layer such as conductive paste layer (not shown in Figures). The exposed portion of the anode substrate serves as anode part. Generally, in order to ensure segregation between cathode part and anode part, masking material (3) is provided.

Lamination can be carried out in various-manners. For example, as shown in FIG. 3, cathode parts of two or more elementary elements (20) for solid electrolytic capacitor, which elements each have an anode part and a cathode part, are laminated on a cathode terminal (from which cathode lead (7) is coming out), anode lead (6) is allowed to come out of the anode part via appropriate conductor (5), and the whole is completely encapsulated with epoxy resin (8) to be a capacitor part (9).

Conventionally, in such a laminate-type solid electrolytic capacitor, for the purpose of obtaining good electric properties by preventing incomplete sealing in applying encapsulation, it has been considered as preferable to stack capacitor elements exactly one on another, that is, a structure including no portion of the elements out of alignment has been preferred (see Japanese Patent Application Laid Open No. H10-144573).

[Patent Document 1] Japanese Patent Application Laid Open No. H10-144573

DISCLOSURE OF INVENTION

Problems to be Solved by Invention

The object in the present invention is to improve electric properties by using a structure different from structures free from misalignment of elements which have been considered as proper in conventional technique.

Means for Solving the Problems

The present inventors studied on effectiveness of a structure different from structures used in conventional technique where elements are simply stacked precisely in the same position one after another, during their course of research on high-precision positioning mechanism to be employed in a step of stacking capacitor elements. As a result, the inventors have found out that electric properties of a capacitor can be improved by using a structure including some misalignment in capacitor elements stacked one atop another, whereby completing the present invention. That is, according to the present invention, a solid electrolytic capacitor and production method thereof are provided.

1. A solid electrolytic capacitor, comprising a stack of solid electrolytic capacitor elements each having an anode part and a cathode part, wherein the stacked structure is such that cathode parts of solid electrolytic capacitor elements are stacked one on another to have some misalignment between the stacked elements.

2. The solid electrolytic capacitor according to 1, wherein the cathode parts of the solid electrolytic capacitor elements each having an anode part and a cathode part are stacked on a cathode terminal.

3. The solid electrolytic capacitor comprising a stack of solid electrolytic capacitor elements each having an anode part and a cathode part according to 2, wherein one end part of the cathode part of at least one of the solid electrolytic capacitor elements stacked on another element is more prominent than that of the element below.

4. The solid electrolytic capacitor according to 3, wherein one end part of the cathode part of every solid electrolytic capacitor element stacked on another element is more prominent than that of the element immediate below.

5. The solid electrolytic capacitor according to 3 or 4, wherein the cathode part is rectangular, and the end part of the cathode part of each of the solid electrolytic capacitor elements stacked on another element is more prominent in any one side of the rectangle than the end part of the cathode part of the element below.

6. The solid electrolytic capacitor according to 5, wherein the end part of cathode part of each of the solid electrolytic capacitor elements stacked on another element is more prominent only in the side opposite to the anode than the end part of the cathode part of the element below.

7. The solid electrolytic capacitor according to any one of 3 to 6, wherein the prominent length of the end part of the cathode part is within a range of 0.01 to 1 mm in terms of distance from the end of the element below.

8. The solid electrolytic capacitor according to any one of 3 to 7, wherein the cathode parts are stacked on a metal cathode terminal.

9. The solid electrolytic capacitor according to 8, wherein the metal cathode terminal is a lead frame.

10. The solid electrolytic capacitor according to 8 or 9, wherein conductor occupies space between the metal cathode terminal and the prominent end part of the cathode part.

11. The solid electrolytic capacitor according to 10, wherein the conductor is a conductive paste.

12. The solid electrolytic capacitor according to 11, wherein the conductive paste is silver paste.

13. The solid electrolytic capacitor according to any one of 8 to 12, wherein solid electrolytic capacitor elements are stacked on one surface of the metal cathode terminal.

14. The solid electrolytic capacitor according to any one of 8 to 12, wherein solid electrolytic capacitor elements are stacked on both surfaces of the metal cathode terminal.

15. The solid electrolytic capacitor according to any one of 3 to 14, wherein the end part is made prominent by imprecisely stacking the solid electrolytic capacitor elements.

16. The solid electrolytic capacitor according to 15, wherein the end of cathode part of every solid electrolytic capacitor element stacked on another element is more prominent than that of the element immediate below so that the whole end part of the capacitor forms a dent.

17. The solid electrolytic capacitor according to any one of 3 to 16, wherein an element having a prominent end has a cathode part larger in area than that of the elements below.

18. The solid electrolytic capacitor according to any one of 3 to 17, wherein the solid electrolytic capacitor element comprises as substrate a valve-action metal having a porous layer on the surface.

19. The solid electrolytic capacitor according to any one of 3 to 18, wherein the cathode part comprises a solid electrolyte layer formed on the porous layer.

20. A method of producing a solid electrolytic capacitor comprising a stack of capacitor elements having an anode part and a cathode part as described in any one of 3 to 19, wherein the solid electrolytic capacitor elements are stacked such that an end part of the cathode part of at least one of the solid electrolytic capacitor elements stacked on another element is more prominent than the end part of the cathode part of the element below.

21. The method of producing the solid electrolytic capacitor according to 20, comprising a step of stacking solid electrolytic capacitor elements each having an anode part and cathode part on a lead frame having corresponding cathode and anode part so that the cathode part and the anode part of each element can correspond to the cathode and anode of the lead frame and that one end part of at least one of the solid electrolytic capacitor elements stacked on another element is more prominent than that of the element below, a step of filling the space between the cathode lead frame and the prominent end parts of the cathode parts with a conductive paste and curing the paste, and a step of encapsulating the whole with resin.

22. The solid electrolytic capacitor comprising a stack of solid electrolytic capacitor elements each having an anode part and a cathode part according to 2, wherein one end part of the cathode part of at least one of the solid electrolytic capacitor elements stacked on another element is more retracted than that of the element below.

23. The solid electrolytic capacitor comprising a stack of solid electrolytic capacitor elements each having an anode part and a cathode part according to 22, wherein one end part of the cathode part of every solid electrolytic capacitor element stacked on another element is more retracted than that of the element below.

24. The solid electrolytic capacitor comprising a stack of solid electrolytic capacitor elements each having an anode part and a cathode part according to 22 or 23, wherein the cathode part is rectangular, and the end part of the cathode part of each of the solid electrolytic capacitor elements stacked on another element is more retracted in any one side of the rectangle than the end part of the element immediate below.

25. The solid electrolytic capacitor comprising a stack of solid electrolytic capacitor elements each having an anode part and a cathode part according to 24, wherein the end part of cathode part of each of the solid electrolytic capacitor elements stacked on another element is more retracted only in the side opposite to the anode than the end part of the cathode part of the element immediate below.

26. The solid electrolytic capacitor according to any one of 22 to 25, wherein the retracted length of the end part of the cathode part is within a range of 0.01 to 1 mm in terms of distance from the end of the element below.

27. The solid electrolytic capacitor according to any one of 22 to 26, wherein the cathode parts are stacked on a metal cathode terminal.

28. The solid electrolytic capacitor according to 27, wherein the metal cathode terminal is a lead frame.

29. The solid electrolytic capacitor according to 27 or 28, wherein solid electrolytic capacitor elements are stacked on one surface of the metal cathode terminal.

30. The solid electrolytic capacitor according to 27 or 28, wherein solid electrolytic capacitor elements are stacked on both surfaces of the metal cathode terminal.

31. The solid electrolytic capacitor according to any one of 22 to 30, wherein the end part is made prominent by imprecisely stacking the solid electrolytic capacitor elements.

32. The solid electrolytic capacitor according to 31, wherein the end of cathode part of every solid electrolytic capacitor element stacked on another element is more retracted than that of the element immediate below so that the whole end part of the capacitor forms a bulge.

33. The solid electrolytic capacitor according to any one of 22 to 32, wherein an element having a retracted end has a cathode part smaller in area than that of the elements below.

34. The solid electrolytic capacitor according to any one of 22 to 33, wherein the solid electrolytic capacitor element comprises as substrate a valve-action metal having a porous layer on the surface.

35. The solid electrolytic capacitor according to any one of 22 to 34, wherein the cathode part comprises a solid electrolyte layer formed on the porous layer.

36. The solid electrolytic capacitor according to any one of 22 to 35, wherein six or more solid electrolytic capacitor elements are stacked.

37. A method of producing the solid electrolytic capacitor described in any one of 22 to 36, comprising a step of stacking solid electrolytic capacitor elements each having an anode part and cathode part, wherein one end part of the cathode part of at least one of the solid electrolytic capacitor elements stacked on another element is more retracted than that of the element below.

Effect of Invention

The present invention improves electric properties of a stacked-type solid electrolytic capacitor by employing a structure where capacitor elements are allowed to be stacked imprecisely, and particularly, the invention achieves reduction in ESR (equivalent series resistance) or LC (leakage current).

BRIEF DESCRIPTION OF DRAWINGS

FIG. 1 is a typical cross-sectional view of a general solid electrolytic capacitor element.

FIG. 2 is a typical cross-sectional view of a state of solid electrolytic capacitor elements stacked according to the present invention.

FIG. 3 is a typical cross-sectional view of solid electrolytic capacitor elements stacked according to conventional technique.

EXPLANATION OF REFERENCE NUMBERS 1 anode substrate
2 porous layer
3 masking material
4 solid electrolyte layer
5 conductor
6 anode lead
7 cathode lead
8 sealing material
9 solid electrolytic capacitor
10 space or conductor
20 solid electrolytic capacitor element
20a undermost solid electrolytic capacitor element
20b intermediate solid electrolytic capacitor element
20c topmost solid electrolytic capacitor element

BEST MODE FOR CARRYING OUT THE INVENTION

Hereinafter, the solid electrolytic capacitor and the production method thereof according to the invention are described by referring to the attached Figures.

As described above, solid electrolytic capacitor in the present invention comprises solid electrolytic capacitor elements having an anode part and a cathode part stacked therein, and has a structure where an end parts of cathode part of at least one of the solid electrolytic capacitor elements each stacked on another element are more prominent or retracted than the solid electrolytic capacitor element below.

That is, if a general type of a stacked-type solid electrolytic capacitor is explained as an example, solid electrolytic capacitor elements each having an anode part and a cathode part are stacked so that the anode parts overlap with each other and so do the cathode parts to make all the ends aligned. The present invention has a structure where an end part of cathode part of at least one of such capacitor elements is more prominent or retracted than that of the underlying capacitor element. Here, unless otherwise specified, the term "upper" used to refer to positional relationship between stacked capacitor elements means the direction toward which stacked elements on the cathode terminal are more away from the cathode terminal (farther from the cathode terminal) and the term "low (below)" means the opposite direction toward which stacked elements are nearer the cathode terminal. Moreover, the structure where capacitor elements are "more prominent or retracted" than the lower elements means at least one end (edge) of cathode part of an capacitor element is placed more outward (prominent) or more inward (retracted) than the end part of the element stacked in a lower position so that the end part of the cathode part of the upper capacitor element can be seen when observed directly from the underneath (prominent structure) or so that the end part of the cathode part of the lower capacitor element can be seen when observed directly from the above (retracted structure). A preferable structure is such that solid electrolytic capacitor elements are stacked imprecisely with respect to lower elements so that an end part of cathode part of every upper solid electrolytic capacitor element is more prominent (FIG. 2 (A)) or more retracted (FIG. 2 (B)) than that of the underlying element. In the structure, the elements need not form gradual prominence or gradual retraction. For example, in a case where three capacitor elements are stacked per one surface of the cathode terminal, embodiments of FIG. 2 include A(i) where the cathode part of the capacitor element placed in the middle (the second from the bottom) is more prominent than that of the lowest capacitor element and A(ii) where the cathode part of the topmost capacitor element (the third from the bottom) is more prominent than that of the lowest capacitor element. In embodiment A(i), the edge faces of the cathode parts of the capacitor element placed in the middle (the second from the bottom) and the topmost capacitor element (the third from the bottom) may be aligned, and in embodiment A(ii), the edge faces of the cathode parts of the capacitor element placed in the middle (the second from the bottom) and the lowest capacitor element may be aligned. A preferred structure is such that an end part of cathode part of every upper solid electrolytic capacitor element stacked another element is more prominent than that of the solid electrolytic capacitor element immediately below the upper element. Similarly, embodiments of FIG. 2 (B) include an embodiment B(i) where the cathode parts of the topmost capacitor element (20c) and the capacitor element placed in the middle (20b) are more retracted than that of the lowest capacitor element, and B(ii) where the cathode part of the topmost capacitor element (20c) is more retracted than those of the capacitor element placed in the middle (20b) and the lowest capacitor element.

There is no particular limitation on the shape of the cathode part of capacitor element as long as any part of the cathode part of an upper element is more prominent or retracted than that of a lower element. That is, all or only some of edges of cathode part of an upper element may be more prominent or more retracted than those of a lower element.

For example, in a case where the shape of cathode part is rectangular, the structure may be such that edges of all the ends of the cathode part of an upper solid electrolytic capacitor element are out of alignment to be more prominent or more retracted that those of a lower solid electrolytic capacitor element. (Such a structure can be achieved by designing an upper solid electrolytic capacitor element to have a cathode part larger or smaller in area than that of a lower element.) Alternatively, a structure where only the end part in the longitudinal direction of the upper element is allowed to be more prominent or more retracted may be employed. (Such a structure can be achieved by designing the length of an upper solid electrolytic capacitor element to be longer or shorter than that of a lower element. Details will follow below.)

By employing a structure as described above, the cathode part of an upper capacitor element covers the cathode part of a lower element wholly or partially. Unexpectedly, only such small changes in structure can improve electric properties of capacitor, particularly ESR. Further, the changes contribute particularly to improvement in LC (leakage current). The mechanism how LC (leakage current) is improved is not clear in detail. For example, it is conceivable that as a result of the outer shape formed to have a smooth gradient line, resistance at the time of encapsulating with resin can be reduced to thereby reduce damage caused by encapsulation. However, this is a mechanism only assumed based on effects in the present invention and this effect had not been anticipated before the invention was achieved.

The present invention can be arbitrarily applied in a solid electrolytic capacitor comprising solid electrolytic capacitor elements having an anode part and a cathode part stacked therein. A structure where cathode parts are stacked on a metal cathode terminal is preferred from viewpoints of implementing production and a step of filling with conductor described later. Preferred material of metal cathode terminal is lead frame material and there is no particular limitation on the material as long as the material is a material generally used. Preferred examples thereof include copper-based materials (suchas alloys of Cu—Ni, Cu—Ag, Cu—Sn, Cu—Fe, Cu—Ni—Ag, Cu—Ni—Sn, Cu—Co—P, Cu—Zn—Mg and Cu—Sn—Ni—P) and materials having surface subjected to treatment of copper-base plating.

Also, solid electrolytic capacitor elements may be stacked on one surface of the metal cathode terminal or on both surfaces of the terminal.

Preferred embodiments where three capacitor elements (20) are stacked on both faces of the metal cathode are shown in FIGS. 2(A) and (B). In comparison with a corresponding structure (FIG. 3) of conventional technique, it will be understood that the present invention has a structure where end parts of upper capacitor elements are out of alignment and more prominent (FIG. 2(A)) or more retracted (FIG. 2(B)) than lower capacitor elements. In FIGS. 2(A) and (B), cross-sections along the longitudinal direction are shown. However, it may have a structure where end parts (side edges) of upper capacitor elements are out of alignment and more prominent (FIG. 2(A)) or more retracted (FIG. 2(B)) than lower capacitor elements, which would be shown if a figure were prepared as a cross-sectional view vertical to the FIG. 2. Also, although capacitor elements are stacked on both faces of the metal cathode terminal in structures shown by FIGS. 2(A) and (B), capacitor elements may be stacked on only one face of the cathode terminal, as described above. (In such a case, in the Figures, the stack is formed on only one of the upper and lower surfaces of anode lead (6) and cathode lead. In the present invention, there is no limitation on structure of the anode side. For example, as with cathode lead (7), the anode side may have a structure where anode parts are stacked on both surfaces. The anode side is curved in FIGS. 2(A) and (B). However, it may be straight, or conductors (such as metal plates) may be inserted between the anode parts, so that the anode part and the cathode part of each capacitor element may have the same height (each from the lead frame).

As shown in FIG. 2(A), in a case where the capacitor has a structure in which end part of each upper capacitor element is more prominent than that of lower capacitor element, space (10) is formed by the prominent parts and the metal cathode. In the present invention, preferably, the space is occupied by conductor. By such a structure, the end part of each capacitor element can contact directly with the conductor to thereby be electrically connected with cathode (7), so that improvement in ESR can be more remarkable. Moreover, by placing conductor in space (10), the prominent parts can be physically supported to thereby become less vulnerable at the time of encapsulation. Preferably, the conductor is a conductive paste. By using a conductive paste as conductor, space (10) which generally has a complicated shape can be completely filled with the conductor. As the conductive paste, any conductive paste generally used in electric devices may be employed. From view points of conductivity, price, and availability, silver paste is preferred.

As shown in FIG. 2 (A), in order to form a stack structure in which end part of each upper capacitor element is more prominent than that of lower capacitor element, cathode parts of solid electrolytic capacitor elements are superimposed one on another in imprecise positional coincidence. For example, such a structure may be formed by using as upper capacitor element to have a prominent end part as described above an element having a cathode part larger in area than that of a lower element. Alternatively, such a prominent part may be prepared by placing one element on another in imprecise positional coincidence between the elements in a direct or indirect manner. (In this case, the areas of the cathode parts of solid electrolytic capacitor elements may be the same with or different from each other.) In this case, the cathode part ends on the anode side of capacitor elements do not precisely overlap with each other and therefore, masking parts (3) of the capacitor elements do not exactly overlap with each other. In a case where conductive paste is applied onto the upper and rear surfaces of the elements to bond the elements, there is a possibility that the conductive paste on an element intrudes masked portion or anode part of an upper element. For purpose of preventing this, it is preferable that the cathode part of an element to have a prominent end be larger or longer than that of the lower elements and that masked portions of the elements overlap exactly with each other. In consideration for the general width, about 1 mm, of a masked portion, uniform capacitor elements having the same area and length of cathode part may be used and stacked with imprecise positional coincidence (in a case where the prominence is on the order of several tens μm and the number of stacked elements is several). Based on a premise that a precise positioning mechanism is used, this method for production would be simpler and more convenient. The prominent length of cathode end part is preferably within a range of 0.01 to 1 mm, more preferably 0.1 to 0.5 mm, in terms of distance between the edges of elements. If the length is less than 0.01 mm, effects in the present invention become not marked. In contrast, if the length is excessively long, there is a possibility that prominent parts are damaged at the time of encapsulation or the like. There is no particular limitation on the number of stacked elements. A preferred number of elements is 2 or more, for example a range of 2 to 5.

As shown in FIG. 2 (B), in order to form a stack structure in which end part of each upper capacitor element is more retracted than that of lower capacitor element, cathode parts of solid electrolytic capacitor elements are superimposed one on another in imprecise positional coincidence. For example, such a structure may be formed by using as upper capacitor element to have a retracted end part as described above an element having a cathode part smaller in area than that of a lower element. Alternatively, such a retracted part may be prepared by placing one element on another in imprecise positional coincidence between the elements in a direct or indirect manner. (In this latter case, the areas of the cathode parts of solid electrolytic capacitor elements may be the same with or different from each other.) The retracted length of cathode end part is preferably within a range of 0.01 to 1 mm, more preferably 0.1 to 0.5 mm, in terms of distance between the edges of elements. If the length is less than 0.01 mm, effects in the present invention become not marked. In contrast, in order to make the retracted length long, imprecise positional coincidence may be generated by using as an upper capacitor element an element having a smaller area and a shorter length, or by superimposing an upper capacitor element at a position quite different from the lower element. The former option is to be used restrictively in consideration for decrease in capacitance while the latter is restrictive in consideration for the structure. For example, in a case where upper capacitor elements are to be moved toward the anode side, the cathode part of each upper capacitor element should not pass across the masked portion of the lower element, which would result in contact with the anode part of the lower element. Therefore, the maximum moving distance of each upper capacitor element is limited according to the width of the masking layer. In consideration for the general width, about 1 mm, of a masked portion, preferably, the moving distance is set to be about 0.5 mm at a maximum. However, these values may vary depending on dimensions such as the size of each element piece and the width of masked portion. According to the number of stacked elements, the elements may be stacked so that the masking portions of the elements overlap partially (in a case where the number of the stacked elements is several). Based on a premise that a precise positioning mechanism is used, this method for production would be simpler and more convenient. As described above, there is no particular limitation on the number of stacked elements and the present invention can be applied in a case where two or more elements are stacked. Particularly, in a capacitor where many elements, especially 6 or more, are stacked, particularly LC (leakage current) is improved markedly.

The solid electrolytic capacitor element may employ any material as its substrate as long as the material can have a cathode part and an anode part each formed thereon. It is preferred that the material is a valve-action metal material having a porous layer on the surface, more preferably, a substrate of valve-action metal comprising a cathode part formed on the porous layer, which comprises a solid electrolyte layer.

There is no particular limitation on the valve-action metal material having a porous layer as long as the material is suitable for use in a solid electrolytic capacitor. For example, the valve-action metal is selected from a group consisting of aluminium, tantalum, niobium, titanium, zirconium and alloys consisting of these metals as base metals, or a sintered body containing these metals as its main component. There is no particular limitation on the shape of the material as long as the shape does not disturb stacking of capacitor elements. Examples thereof include a thin plate, a foil and a bar and particularly preferred are a thin plate and a foil. These metals have dielectric oxide films as a result of surface oxidation by oxygen present in the air. However, it is preferable that the surface of the metal is subjected to etching treatment and chemical formation to thereby be a valve-action metal having a dielectric oxide film formed thereon.

It is preferable that the valve-action metal substrate having the surface roughened be used after cut out into a desired size for the solid electrolytic capacitor.

As a valve-action metal, although the thickness depends on intended uses, generally, those in form of thin plate or foil having a thickness of about 40 to 150 μm are employed. Also, although the size and shape of the valve-action metal foil depend on intended uses, generally, preferred are rectangular substrates of about 1 to 50 mm in width and 1 to 50 mm in length as a flat-plate element unit, more preferred are those of 2 to 20 mm in width and 2 to 20 mm in length, particularly preferred are 2 to 5 mm in width and 2 to 6 mm in length.

Examples of solid electrolyte include electroconductive polymers comprising as repeating unit a structure represented by a compound having a thiophene skeleton, a compound having a polycyclic sulfide skeleton, a compound having a pyrrole skeleton, a compound having a furan skeleton or a compound having an aniline skeleton.

Examples of compound having a thiophene skeleton include derivatives of 3-methyl thiophene, 3-ethyl thiophene, 3-propyl thiophene, 3-butyl thiophene, 3-pentyl thiophene, 3-hexyl thiophene, 3-heptyl thiophene, 3-octyl thiophene, 3-nonyl thiophene, 3-decyl thiophene, 3-fluorothiophene, 3-chlorothiophene, 3-bromothiophene, 3-cyanothiophene, 3,4-dimethyl thiophene, 3,4-diethyl thiophene, 3,4-butylene thiophene, 3,4-methylene dioxythiophene and 3,4-ethylene dioxythiophene. These compounds can be obtained as commercially available products or prepared by known methods (e.g., see Synthetic Metals, 1986, Vol. 15, Page 169). However, the present invention is not limited thereto.

Examples of compound having a polycyclic sulfide skeleton usable here include a compound having 1,3-dihydro polycyclic sulfide (also called 1,3-dihydrobenzo[c] thiophene) skeleton and a compound having a 1,3-dihydronaphtho[2,3-c]thiophene skeleton. Further, examples include a compound having a 1,3-dihydroanthra[2,3-c] thiophene skeleton, and a compound having a 1,3-dihydronaphthaceno[2,3-c]thiophene skeleton. They can be prepared by known methods, such as the method described in Japanese Patent Application Laid-Open No. 8-3156.

Furthermore, usable examples include a compound having a 1,3-dihydronaphtho[1,2-c]thiophene skeleton, a 1,3-dihydro phenanthra[2,3-c]thiophene derivative, a compound having a 1,3-dihydrotriphenylo[2,3-c]thiophene skeleton, and a 1,3-dihydrobenzo[a]anthraceno[7,8-c]thiophene derivative.

In some cases, nitrogen or N-oxide is arbitrarily contained in a condensed ring. Examples thereof include 1,3-dihydrothieno[3,4-b]quinoxaline, 1,3-dihydrothieno[3,4-b]quinoxaline-4-oxide and 1,3-dihydrothieno[3,4-b]quinoxaline-4,9-dioxide. However, the invention is not limited thereto.

Examples of compound having a pyrrole skeleton include derivatives of 3-methylpyrrole, 3-ethylpyrrole, 3-propylpyrrole, 3-butylpyrrole, 3-pentylpyrrole, 3-hexylpyrrole, 3-heptylpyrrole, 3-octylpyrrole, 3-nonylpyrrole, 3-decylpyrrole, 3-fluoropyrrole, 3-chloropyrrole, 3-bromopyrrole, 3-cyanopyrrole, 3,4-dimethylpyrrole, 3,4-diethylpyrrole, 3,4-butylenepyrrole, 3,4-methylene dioxypyrrole and 3,4-ethylene dioxypyrrole.

Examples of compound having a furan skeleton include derivatives of 3-methylfuran, 3-ethylfuran, 3-propylfuran, 3-butylfuran, 3-pentylfuran, 3-hexylfuran, 3-heptylfuran, 3-octylfuran, 3-nonylfuran, 3-decylfuran, 3-fluorofuran, 3-chlorofuran, 3-bromofuran, 3-cyanofuran, 3,4-dimethylfuran, 3,4-diethylfuran, 3,4-butylenefuran, 3,4-methylenedioxyfuran and 3,4-ethylenedioxyfuran.

Examples of compound having an aniline skeleton include derivatives of 2-methylaniline, 2-ethylaniline, 2-propylaniline, 2-butylaniline, 2-pentylaniline, 2-hexylaniline, 2-heptylaniline, 2-octylaniline, 2-nonylaniline, 2-decylaniline, 2-fluoroaniline, 2-chloroaniline, 2-bromoaniline, 2-cyanoaniline, 2,5-dimethylaniline, 2,5-diethyl aniline, 3,4-butylene aniline, 3,4-methylene dioxyaniline and 3,4-ethylene dioxyaniline. These compounds can be obtained as commercially available products or prepared by known methods. However, the above compounds are mere examples and the electroconductive polymer forming solid electrolyte in the present invention is not limited thereto.

Also, combination of compounds selected from above compound groups may be used as ternary copolymer. In such a case, the composition ratio between the polymerizable monomers and the like depend on polymerization conditions and preferable composition ratio and polymerization conditions can be confirmed by carrying out simple tests.

Solid electrolyte is prepared by allowing the above monomers to contact with oxidant to cause oxidation polymerization. As oxidant used for preparation of electroconductive polymer to serve as solid electrolyte, any oxidant may be used as long as the oxidant can cause oxidation reaction in dehydrogenative 4-electron oxidation reaction satisfactorily. Specifically, compounds relatively inexpensive from industrial viewpoint and easy to handle in the production process are includes. Specific examples include Fe (III) compounds such as $FeCl_3$, $FeClO_4$ and Fe (organic acid anion) salt, anhydrous aluminium chloride/cuprous chloride, alkali metal persulfates, ammonium persulfates, peroxides, manganese compounds such as potassium permaganate, quinones such as 2,3-dichloro-5,6-dicyano-1,4-benzoquinone(DDQ),tetrachloro-1,4-benzoquinone and tetracyano-1,4-benzoquinone, halogens such as iodine and bromine, sulfonic acids such as peracid, sulfuric acid, fuming sulfuric acid, sulfur trioxide, chlorosulfuric acid, fluorosulfuric acid and amidosulfonic acid, ozone and combinations of two or more of these oxidants.

The present invention provides a production method of solid electrolytic capacitor comprising solid electrolytic capacitor elements having an anode part and a cathode part stacked therein, which include a step of stacking so that end part of cathode part of at least one of the upper solid electrolytic capacitor elements is more prominent or more retracted than that of a lower element. Preferably, the method includes a step of stacking solid electrolytic capacitor elements on positions corresponding to the cathode and the anode respectively of a lead frame, in a manner that the cathode and the anode correspond to the cathode part and the anode part respectively in each of the element, and that end part of cathode part of at least one of the upper solid electrolytic capacitor elements is more prominent than that of a lower element, a step of filling space formed between the cathode lead frame and the prominent end parts of cathode parts with conductive paste and curing it, and a step of encapsulating the whole with resin. There is no particular limitation on sealant resin. Examples thereof include insulative resin such as epoxy resin.

EXAMPLES

Hereinafter, the present invention will be explained by specifically referring to Examples.

Example 1

A chemically formed aluminum foil having a thickness of 110 μm cut to have a 3.5-mm width is cut into pieces each having a length of 13 mm. One short side of each foil piece is attached to a metal guide by welding. In order to chemically form cut surfaces, the portion 7 mm from the unfixed end of each foil piece is coated with masking material (heat resistant resin) to form a 0.8 mm-wide line and dried at about 180° C. for 30 minutes. The portion from the unfixed end to the polyimide resin coating of each foil piece is immersed in an aqueous ammonium adipate solution and a voltage of 3 V is applied to chemically form the cut surface which has not been chemically formed, to form a dielectric oxide film thereon.

Solid electrolyte is formed on the cathode region as follows. That is, the cathode region (3.5 mm×4.6 mm) of each foil piece is immersed in an isopropanol solution (solution 1) containing 20 mass % of 3,4-ethylenedioxythiophene. Then, the foil is pulled out of the solution and left standing at 25° C. for 5 minutes. Next, the cathode region of the foil is immersed in an aqueous solution (solution 2) containing 30 mass % of ammonium persulfate. Then, the foil is pulled out and dried at 45° C. for 10 minutes to thereby perform oxidative polymerization. The series of the procedures of immersion in solution 1/immersion in solution 2/oxidative polymerization is repeated 15 times. Next, the foil pieces are washed by hot water of 50° C. for 30 minutes and dried at 100° C. for 30 minutes, to thereby form solid electrolyte layer. Furthermore, carbon paste and silver paste are applied on the cathode part on each piece to form an electrode thereon, whereby capacitor elements are completed.

Three of thus obtained capacitor elements are stacked on one surface of a lead frame (cathode) and bonded with silver paste while placing one capacitor element on another at a position different by 20 μm in the cathode end direction from the position of a lower element. An anode lead terminal is connected by welding to the part uncoated with solid electrolyte of the foil. Subsequently, silver paste is applied on a region ranging from cathode end surface of each of the stacked capacitor elements to cathode lead frame surface. The entirety of the stacked elements is encapsulated with epoxy resin. About 450 units of stacked-type capacitor of 2V and 100 pF are obtained. Among them, 96 capacitor units are selected randomly and the equivalent series resistance (hereinafter, referred to as ESR) at 100 kHz is measured. The average value of the ESR is 16.6 mΩ.

Example 2

About 450 units of stacked-type capacitor are obtained in the same manner as in Example 1, except that coating a region ranging from cathode end surface of each of the stacked capacitor elements to cathode lead frame surface with silver paste is not conducted. Among them, 96 capacitor units are selected randomly and the equivalent series resistance (hereinafter, referred to as ESR) at 100 kHz is measured. The average value of the ESR is 19.6 mΩ.

Comparative Example 1

About 450 units of stacked-type capacitor are obtained in the same manner as in Example 2, except that the capacitor elements are stacked such that the edge surfaces of the cathode parts are aligned together. Among them, 96 capacitor units are selected randomly and the equivalent series resistance (hereinafter, referred to as ESR) at 100 kHz is measured. The average value of the ESR is 21.5 mΩ.

Example 3

Capacitor elements are prepared in the same manner as in Example 1. Three of the obtained capacitor elements are stacked on both surfaces of a lead frame respectively while placing one capacitor element on another at a position different by 40 μm in the cathode end direction from the position of a lower element. Subsequently, silver paste is applied on a region ranging from cathode end surface of each of the stacked capacitor elements to cathode lead frame surface. The entirety of the stacked elements is encapsulated with epoxy resin. About 200 units of stacked-type capacitor of 2V and 220 μF are obtained. Among them, 96 capacitor units are selected randomly and the equivalent series resistance (hereinafter, referred to as ESR) at 100 kHz is measured. The average value of the ESR is 6.9 mΩ.

Example 4

About 200 units of stacked-type capacitor are obtained in the same manner as in Example 3, except that coating a region ranging from cathode end surface of each of the stacked capacitor elements to cathode lead frame surface with silver paste is not conducted. Among them, 96 capacitor units are selected randomly and the equivalent series resistance (hereinafter, referred to as ESR) at 100 kHz is measured. The average value of the ESR is 8.8 mΩ.

Comparative Example 2

About 200 units of stacked-type capacitor are obtained in the same manner as in Example 4, except that the capacitor elements are stacked such that the edge surfaces of the cathode parts are aligned together. Among them, 96 capacitor units are selected randomly and the equivalent series resistance (hereinafter, referred to as ESR) at 100 kHz is measured. The average value of the ESR is 9.8 mΩ.

Example 5

A chemically formed aluminum foil having a thickness of 110 μm cut to have a 3.5-mm width is cut into pieces each having a length of 13 mm. One short side of each foil piece is attached to a metal guide by welding. In order to chemically form cut surfaces, the portion 7 mm from the unfixed end of each foil piece is coated with masking material (heat resistant resin) to form a 0.8 mm-wide line and dried at about 180° C. for 30 minutes. The portion from the unfixed end to the polyimide resin coating of each foil piece is immersed in an aqueous ammonium adipate solution and a voltage of 12 V is applied to chemically form the cut surface which has not been chemically formed, to form a dielectric oxide film thereon.

Solid electrolyte is formed on the cathode region as follows. That is, the cathode region (3.5 mm×4.6 mm) of each foil piece is immersed in an isopropanol solution (solution 1) containing 20 mass % of 3,4-ethylenedioxythiophene. Then, the foil is pulled out of the solution and left standing at 25° C. for 5 minutes. Next, the cathode region of the foil is immersed in an aqueous solution (solution 2) containing 30 mass % of ammonium persulfate. Then, the foil is pulled out and dried at 45° C. for 10 minutes to thereby perform oxidative polymerization. The series of the procedures of immersion in solution 1/immersion in solution 2/oxidative polymerization is repeated 15 times. Next, the foil pieces are washed by hot water of 50° C. for 30 minutes and dried at 100° C. for 30 minutes, to thereby form solid electrolyte layer. Furthermore, carbon paste and silver paste are applied on the cathode part on each piece to form an electrode thereon, whereby capacitor elements are completed.

Two of thus obtained capacitor elements are stacked on one surface of a lead frame (cathode) and bonded with silver paste while placing one capacitor element on the other at a position different by 0.5 mm in the anode end direction from the position of the lower element. An anode lead terminal is connected by welding to the part uncoated with solid electrolyte of the foil. On the other surface of the lead frame, one capacitor element is placed at a position corresponding to the position of the elements stacked on the opposite surface.

Subsequently, silver paste is applied on a region ranging from cathode end surface of each of the stacked capacitor elements to cathode lead frame surface. The entirety of the stacked elements is encapsulated with epoxy resin. About 450 units of stacked-type capacitor of 8V and 33 μF are obtained. Among them, 200 capacitor units are selected randomly and a rated voltage of 8V is applied to the units to measure leakage current values (LC). The average value of the LC is 0.17 μA.

Example 6

About 450 units of stacked-type capacitor with 8 V and 68 pF are obtained in the same manner as in Example 5, except that 3 capacitor elements are stacked on both surfaces of the lead frame respectively. Among them, 200 capacitor units are selected randomly and a rated voltage of 8V is applied to the units to measure leakage current values (LC). The average value of the LC is 0.48 μA.

Example 7

About 450 units of stacked-type capacitor with 8 V and 150 μF are obtained in the same manner as in Example 5, except that 6 capacitor elements are stacked on both surfaces of the lead frame respectively while placing one capacitor element on another at a position different by 0.3 mm from the position of the lower element. Among them, 200 capacitor units are selected randomly and a rated voltage of 8V is applied to the units to measure leakage current values (LC). The average value of the LC is 0.98 μA.

Comparative Example 3

About 450 units of stacked-type capacitor with 8 V and 33 pF are obtained in the same manner as in Example 5, except that capacitor elements are stacked such that the edge surfaces of the cathode parts are exactly aligned together. Among them, 200 capacitor units are selected randomly and a rated voltage of 8V is applied to the units to measure leakage current values (LC). The average value of the LC is 0.19 μA.

Comparative Example 4

About 450 units of stacked-type capacitor with 8 V and 68 pF are obtained in the same manner as in Example 6, except that capacitor elements are stacked such that the edge surfaces of the cathode parts are exactly aligned together. Among them, 200 capacitor units are selected randomly and a rated voltage of 8V is applied to the units to measure leakage current values (LC). The average value of the LC is 0.58 μA.

Comparative Example 5

About 450 units of stacked-type capacitor with 8 V and 150 pF are obtained in the same manner as in Example 7, except that capacitor elements are stacked such that the edge surfaces of the cathode parts are exactly aligned together. Among them, 200 capacitor units are selected randomly and a rated voltage of 8V is applied to the units to measure leakage current values (LC). The average value of the LC is 1.80 μA.

The results obtained from each of the Examples above and capacitance of the capacitors are shown in Table 1 together with indication of stacking conditions. In Table 1, the stacked number is the number of capacitor elements used per capacitor, stacking mode is the number of capacitor elements stacked on each surface of a lead frame and difference in positioning is a difference in position between two adjacent elements.

TABLE 1

| | Stacked number | Stacking mode (number) (one side/ the other side) | Difference in positioning (mm) | Leakage current (μA) |
|---|---|---|---|---|
| Example 5 | 3 | 2/1 | 0.5 | 0.17 |
| Example 6 | 6 | 3/3 | 0.5 | 0.48 |
| Example 7 | 12 | 6/6 | 0.3 | 0.98 |
| Comparative Example 3 | 3 | 2/1 | 0.5 | 0.19 |
| Comparative Example 4 | 6 | 3/3 | 0.5 | 0.58 |
| Comparative Example 5 | 12 | 6/6 | 0.3 | 1.80 |

In conventional technique, the more elements stacked, the higher the leakage current value. However, as shown in the above results, such an increase in LC accompanying increase in the number of stacked elements can be suppressed in the present invention. The present invention can exhibit the effect even when only two elements are stacked. The present invention is especially useful in producing a solid electrolytic capacitor where more elements are stacked. That is, it is damage caused by encapsulation that increases the LC per capacitor element, and this tendency is marked when many elements are stacked. However, by employing the technique in the present invention, such deterioration can be reduced even when many elements are stacked. The effect in the present invention is especially remarkable when six or more capacitor elements are stacked although the invention can also exhibit the effect in a case where two elements are stacked on one side.

INDUSTRIAL APPLICABILITY

According to the present invention, in production of stacked-type solid electrolytic capacitor where precise alignment of stacked elements has been conventionally preferred, improvement of equivalent series resistance (hereinafter, referred to as ESR) can be realized by employing a structure of imprecise alignment or another similar structure where upper elements are prominent at their ends than lower elements, or improvement in leakage current can be realized by employing a structure where upper elements are retracted at their ends than lower elements. Particularly, by filling the space formed by the prominent parts of the upper elements and the cathode metal surface (cathode lead frame) with conductive paste, improvement in ESR can be remarkable. The present invention which can be implemented only through control in positioning stacked elements and/or adjustment in length or area of cathode part of each element, is extremely useful as a manufacturing technique of a stacked-type solid electrolytic capacitor.

The invention claimed is:

1. A solid electrolytic capacitor, comprising a stack of solid electrolytic capacitor elements each having an anode part and a cathode part, wherein the stacked structure is such that cathode parts of the solid electrolytic capacitor elements are stacked one on another to have misalignment between the stacked elements within a range of 0.01 to 1 mm in terms of distance from the end of the element below.

2. The solid electrolytic capacitor according to claim 1, wherein the cathode parts of the solid electrolytic capacitor elements each having an anode part and a cathode part are stacked on a cathode terminal.

3. The solid electrolytic capacitor comprising a stack of solid electrolytic capacitor elements each having an anode part and a cathode part according to claim 2, wherein one end part of the cathode part of at least one of the solid electrolytic capacitor elements stacked on another element is more prominent than that of the element below.

4. The solid electrolytic capacitor according to claim 3, wherein one end part of the cathode part of every solid electrolytic capacitor element stacked on another element is more prominent than that of the element immediate below.

5. The solid electrolytic capacitor according to claim 3, wherein the cathode part is rectangular, and the end part of the cathode part of each of the solid electrolytic capacitor elements stacked on another element is more prominent in any one side of the rectangle than the end part of the cathode part of the element below.

6. The solid electrolytic capacitor according to claim 5, wherein the end part of the cathode part of each of the solid electrolytic capacitor elements stacked on another element is more prominent only in the side opposite to the anode than the end part of the cathode part of the element below.

7. The solid electrolytic capacitor according to claim 3, wherein the cathode terminal is a metal terminal.

8. The solid electrolytic capacitor according to claim 7, wherein the metal cathode terminal is a lead frame.

9. The solid electrolytic capacitor according to claim 7, wherein a conductor occupies a space between the metal cathode terminal and the prominent end part of the cathode part.

10. The solid electrolytic capacitor according to claim 9, wherein the conductor is a conductive paste.

11. The solid electrolytic capacitor according to claim 10, wherein the conductive paste is silver paste.

12. The solid electrolytic capacitor according to claim 7, wherein the solid electrolytic capacitor elements are stacked on one surface of the metal cathode terminal.

13. The solid electrolytic capacitor according to claim 7, wherein the solid electrolytic capacitor elements are stacked on both surfaces of the metal cathode terminal.

14. The solid electrolytic capacitor according to claim 3, wherein the end part of the cathode part is made prominent by imprecisely stacking the solid electrolytic capacitor elements.

15. The solid electrolytic capacitor according to claim 14, wherein the end of cathode part of every solid electrolytic capacitor element stacked on another element is more prominent than that of the element immediate below so that the whole end part of the capacitor forms a dent.

16. The solid electrolytic capacitor according to claim 3, wherein the cathode part of at least one of the solid electrolytic elements having the prominent end is larger in area than that of the elements below.

17. The solid electrolytic capacitor according to claim 3, wherein the solid electrolytic capacitor element comprises as a substrate a valve-action metal having a porous layer on the surface.

18. The solid electrolytic capacitor according to claim 3, wherein the cathode part comprises a solid electrolyte layer formed on the porous layer.

19. A method of producing a solid electrolytic capacitor comprising a stack of capacitor elements having an anode part and a cathode part as described in claim 3, wherein the solid electrolytic capacitor elements are stacked such that an end part of the cathode part of at least one of the solid electrolytic capacitor elements stacked on another element is more prominent than the end part of the cathode part of the element below.

20. The method of producing the solid electrolytic capacitor according to claim 19, comprising a step of stacking solid electrolytic capacitor elements each having an anode part and cathode part on a lead frame having a corresponding cathode and anode so that the cathode part and the anode part of each element can correspond to the cathode and anode of the lead frame and that one end part of at least one of the solid electrolytic capacitor elements stacked on another element is more prominent than that of the element below, a step of filling a space between the cathode lead frame and the prominent end parts of the cathode parts with a conductive paste and curing the paste, and a step of encapsulating the whole with a resin.

21. The solid electrolytic capacitor comprising a stack of solid electrolytic capacitor elements each having an anode part and a cathode part according to claim 2, wherein one end part of the cathode part of at least one of the solid electrolytic capacitor elements stacked on another element is more retracted than that of the element below.

22. The solid electrolytic capacitor comprising a stack of solid electrolytic capacitor elements each having an anode part and a cathode part according to claim 21, wherein one end part of the cathode part of every solid electrolytic capacitor element stacked on another element is more retracted than that of the element below.

23. The solid electrolytic capacitor comprising a stack of solid electrolytic capacitor elements each having an anode part and a cathode part according to claim 21, wherein the cathode part is rectangular, and the end part of the cathode part of each of the solid electrolytic capacitor elements stacked on another element is more retracted in any one side of the rectangle than the end part of the element immediate below.

24. The solid electrolytic capacitor comprising a stack of solid electrolytic capacitor elements each having an anode part and a cathode part according to claim 23, wherein the end part of the cathode part of each of the solid electrolytic capacitor elements stacked on another element is more retracted only in the side opposite to the anode part than the end part of the cathode part of the element immediate below.

25. The solid electrolytic capacitor according to claim 21, wherein the cathode terminal is a metal terminal.

26. The solid electrolytic capacitor according to claim 25, wherein the metal cathode terminal is a lead frame.

27. The solid electrolytic capacitor according to claim 25, wherein the solid electrolytic capacitor elements are stacked on one surface of the metal cathode terminal.

28. The solid electrolytic capacitor according to claim 25, wherein the solid electrolytic capacitor elements are stacked on both surfaces of the metal cathode terminal.

29. The solid electrolytic capacitor according to claim 21, wherein the end part of the cathode part is made retracted by imprecisely stacking the solid electrolytic capacitor elements.

30. The solid electrolytic capacitor according to claim 29, wherein the end part of the cathode part of every solid electrolytic capacitor element stacked on another element is more retracted than that of the element immediate below so that the whole end part of the capacitor forms a bulge.

31. The solid electrolytic capacitor according to claim 21, wherein the cathode part of at least one of the solid electrolytic elements having the retracted end is smaller in area than that of the elements below.

32. The solid electrolytic capacitor according to claim 21, wherein the solid electrolytic capacitor element comprises as a substrate a valve-action metal having a porous layer on the surface.

33. The solid electrolytic capacitor according to claim 21, wherein the cathode part comprises a solid electrolyte layer formed on the porous layer.

34. The solid electrolytic capacitor according to claim 21, wherein six or more solid electrolytic capacitor elements are stacked.

35. A method of producing the solid electrolytic capacitor described in claim 21, comprising a step of stacking solid electrolytic capacitor elements each having an anode part and cathode part, wherein one end part of the cathode part of at least one of the solid electrolytic capacitor elements stacked on another element is more retracted than that of the element below.

* * * * *